(12) United States Patent
Bernardon

(10) Patent No.: US 12,368,383 B2
(45) Date of Patent: Jul. 22, 2025

(54) ISOLATED DC/DC CONVERTER AND POWER ELECTRONICS SYSTEM

(71) Applicant: Infineon Technologies Austria AG, Villach (AT)

(72) Inventor: Derek Bernardon, Villach (AT)

(73) Assignee: Infineon Technologies Austria AG, Villach (AT)

( * ) Notice: Subject to any disclaimer, the term of this patent is extended or adjusted under 35 U.S.C. 154(b) by 322 days.

(21) Appl. No.: 18/120,692

(22) Filed: Mar. 13, 2023

(65) Prior Publication Data

US 2024/0313658 A1     Sep. 19, 2024

(51) Int. Cl.
| | |
|---|---|
| H02M 7/48 | (2007.01) |
| H02M 1/00 | (2006.01) |
| H02M 1/44 | (2007.01) |
| H02M 3/335 | (2006.01) |
| H02M 7/5387 | (2007.01) |

(52) U.S. Cl.
CPC ..... *H02M 3/33569* (2013.01); *H02M 1/0009* (2021.05); *H02M 1/0012* (2021.05); *H02M 1/44* (2013.01); *H02M 7/4811* (2021.05); *H02M 7/4815* (2021.05); *H02M 7/4826* (2013.01); *H02M 7/53871* (2013.01)

(58) Field of Classification Search
CPC ............. H02M 7/4811; H02M 7/4815; H02M 7/4826; H02M 7/53871
See application file for complete search history.

(56) References Cited

U.S. PATENT DOCUMENTS

| | | | |
|---|---|---|---|
| 4,801,822 | A | 1/1989 | Idaka et al. |
| 5,514,996 | A | 5/1996 | Aizawa |
| 6,316,956 | B1 | 11/2001 | Oglesbee |
| 7,952,418 | B2 | 5/2011 | McDonald et al. |
| 8,760,219 | B2 | 6/2014 | Chao |
| 9,209,787 | B2 | 12/2015 | Shelton et al. |
| 9,305,917 | B1 | 4/2016 | Curatola et al. |
| 9,595,950 | B1 | 3/2017 | Seok |

(Continued)

OTHER PUBLICATIONS

Anthony, P., et al., "A design method for isolated resonant gate drivers", 7th IET International Conference on Power Electronics, Machines and Drives (PEMD 2014), Apr. 10, 2014, pp. 1-6.

(Continued)

*Primary Examiner* — Gary A Nash
(74) *Attorney, Agent, or Firm* — Murphy, Bilak & Homiller, PLLC

(57) ABSTRACT

An isolated DC/DC converter includes: a transformer having a primary side and a secondary side; an inverter configured to change a DC input voltage (Vin) to an AC current for energizing the primary side of the transformer; a capacitor in series with the primary side of the transformer; and a controller configured to operate the inverter in a first mode such that the capacitor pre-charges to |Vin| before the controller receives a turn ON command, the capacitor charges to X*|Vin| during a first part of a first switching cycle after the controller receives the turn ON command where X>1, and the capacitor voltage resonates with a magnetizing inductance of the primary side of the transformer during a second part of the first switching cycle. A power electronics device that includes the isolated DC/DC converter is also described.

24 Claims, 10 Drawing Sheets

(56) References Cited

U.S. PATENT DOCUMENTS

| | | |
|---|---|---|
| 9,853,637 B1 | 12/2017 | Meiser et al. |
| 9,865,729 B1 | 1/2018 | Pendharkar et al. |
| 10,270,439 B2 * | 4/2019 | Mao .................. H02M 3/33523 |
| 10,483,352 B1 | 11/2019 | Mokhti et al. |
| 10,720,913 B1 | 7/2020 | Leong et al. |
| 10,958,268 B1 | 3/2021 | Leong et al. |
| 2006/0238927 A1 | 10/2006 | Morbe et al. |
| 2007/0081280 A1 | 4/2007 | Strzalkowski et al. |
| 2009/0072269 A1 | 3/2009 | Suh et al. |
| 2010/0060326 A1 | 3/2010 | Palmer et al. |
| 2010/0118458 A1 | 5/2010 | Coffey |
| 2010/0205614 A1 | 8/2010 | Harrington |
| 2011/0273258 A1 | 11/2011 | Duplessis et al. |
| 2012/0158188 A1 | 6/2012 | Madala |
| 2014/0049297 A1 | 2/2014 | Nagai et al. |
| 2014/0091311 A1 | 4/2014 | Jeon et al. |
| 2014/0167724 A1 | 6/2014 | Deng et al. |
| 2014/0307482 A1 * | 10/2014 | Chen .................. H02M 3/3376 363/21.02 |
| 2015/0171852 A1 | 6/2015 | Pang |
| 2015/0228353 A1 | 8/2015 | Qing et al. |
| 2015/0255547 A1 | 9/2015 | Yuan et al. |
| 2015/0295574 A1 | 10/2015 | Nagai |
| 2015/0318851 A1 | 11/2015 | Roberts et al. |
| 2015/0344335 A1 | 12/2015 | Hughes et al. |
| 2015/0381148 A1 | 12/2015 | Zeng |
| 2016/0072376 A1 | 3/2016 | Ahlers et al. |
| 2016/0087622 A1 | 3/2016 | Kaeriyama |
| 2016/0142048 A1 | 5/2016 | Zoels et al. |
| 2016/0322968 A1 | 11/2016 | Mao et al. |
| 2017/0040312 A1 | 2/2017 | Curatola et al. |
| 2017/0271497 A1 | 9/2017 | Fayed et al. |
| 2017/0331471 A1 | 11/2017 | Yuzurihara et al. |
| 2018/0183343 A1 * | 6/2018 | Ausseresse ......... H02M 3/3376 |
| 2018/0234022 A1 * | 8/2018 | Ye ..................... H02M 3/33576 |
| 2018/0337610 A1 * | 11/2018 | Leong .................. H02M 1/083 |
| 2019/0123215 A1 | 4/2019 | Stark |
| 2019/0372567 A1 | 12/2019 | Yoshida et al. |
| 2020/0007044 A1 * | 1/2020 | Sato ....................... H02M 1/36 |
| 2020/0007091 A1 | 1/2020 | Li et al. |
| 2020/0007119 A1 | 1/2020 | Li et al. |
| 2020/0020779 A1 | 1/2020 | Trang et al. |
| 2020/0343352 A1 | 10/2020 | Trang et al. |
| 2021/0067045 A1 * | 3/2021 | Zhang ............... H02M 3/33573 |
| 2021/0408922 A1 * | 12/2021 | Zhang ............... H02M 3/33592 |

OTHER PUBLICATIONS

Coccia, A., et al., "Wide input Voltage range Compensation in DC/DC Resonant Architectures for On-Board Traction Power Supplies", IEEE 2007 European Conference on Power Electronics and Applications, Sep. 2-5, 2007, 1-10.

* cited by examiner

ISOLATED DC/DC CONVERTER AND POWER ELECTRONICS SYSTEM

BACKGROUND

Adoption of GaN power switch devices in power electronics systems continues to increase. Compared to their power MOSFET counterparts, GaN power switch devices have a faster turn-on time. However, in many types of power electronics systems, the power switch device is galvanically isolated from the primary side of the system. Also, GaN power switch devices require a constant current to remain in the on-state. Accordingly, the driver of a GaN power switch device must be efficient in maintaining a constant current. Typically, a single large coreless transformer is provided for driving the gate of a GaN power device through a full-bridge driver topology to turn on a GaN power switch device. However, the full bridge topology is inefficient at providing a constant current since the full bridge has a significant rms current on the primary side due to the low magnetizing inductance of the coreless transformer. Also, the maximum energy that can be transferred over the coreless transformer under turn-on conditions is limited by the input voltage and the magnetizing inductance on the primary side.

Thus, there is a need for an improved topology for power electronics systems that use GaN power switch devices or other types of power switch devices having fast turn-on time and that require constant current in the on-state.

SUMMARY

According to an embodiment of an isolated DC/DC converter, the isolated DC/DC converter comprises: a transformer having a primary side and a secondary side; an inverter configured to change a DC input voltage (Vin) to an AC current for energizing the primary side of the transformer; a capacitor in series with the primary side of the transformer; and a controller configured to operate the inverter in a first mode such that the capacitor pre-charges to |Vin| before the controller receives a turn ON command, the capacitor charges to X*|Vin| during a first part of a first switching cycle after the controller receives the turn ON command where X>1, and the capacitor voltage resonates with a magnetizing inductance of the primary side of the transformer during a second part of the first switching cycle.

According to an embodiment of a power electronics system, the power electronics system comprises: a power switch device; a pulldown switch device configured to turn off the power switch device when the pulldown switch device is on; a flyback converter configured to drive a gate of the power switch device; and an isolated DC/DC converter comprising: a transformer having a primary side and a secondary side; a rectifier coupled between the secondary side of the transformer and a gate of the pulldown switch device; an inverter configured to change a DC input voltage (Vin) to an AC current for energizing the primary side of the transformer; a capacitor in series with the primary side of the transformer; and a controller configured to operate the inverter in a first mode such that the capacitor pre-charges to |Vin| before the controller receives a turn ON command for the pulldown switch device, the capacitor charges to X*|Vin| during a first part of a first switching cycle after the controller receives the turn ON command where X>1, and the capacitor voltage resonates with a magnetizing inductance of the primary side of the transformer during a second part of the first switching cycle.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Described herein are embodiments of an isolated DC/DC converter and related power electronics system that uses GaN power switch devices or other types of power switch devices having fast turn-on time and that require constant current in the on-state. The power switch device is on the secondary side of the isolated DC/DC converter and galvanically isolated from an inverter on the primary side by a transformer. A controller on the primary side of the isolated DC/DC converter ensures a resonant tank capacitor coupled to the inverter is charged to a suitable voltage that is above the DC input voltage to the isolated DC/DC converter, thereby ensuring sufficient energy is transferred over the transformer to take advantage of the fast turn on time of the power switch device on the secondary side. When the power switch device is in the on-state, the inverter is controlled such that a constant gate current is maintained for the power switch device.

Described next, with reference to the figures, are exemplary embodiments of the isolated DC/DC converter and related power electronics system.

Figure 1:
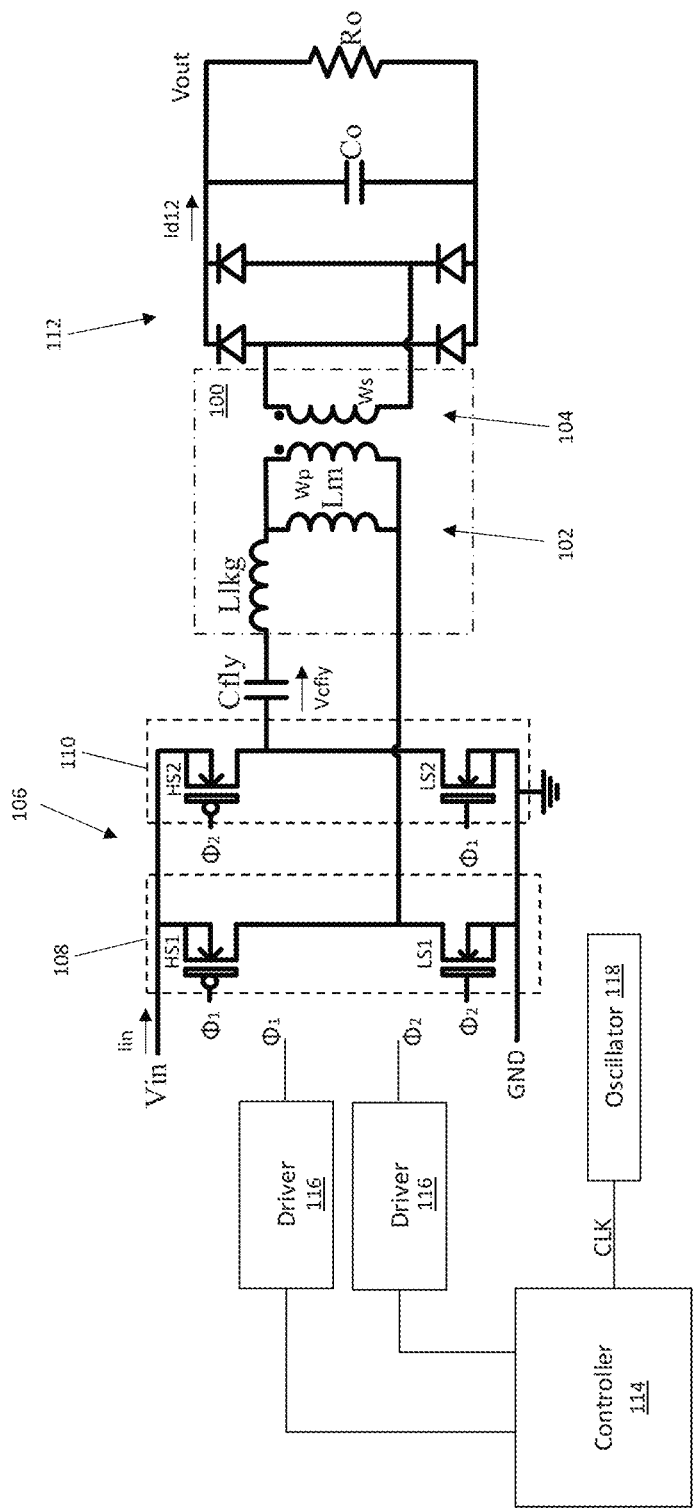
FIG. 1 illustrates a schematic diagram of an embodiment of an isolated DC/DC converter.

FIG. 1 illustrates an embodiment of the isolated DC/DC converter. According to this embodiment, the isolated DC/DC converter includes a transformer 100 having a primary side 102 and a secondary side 104. In one embodiment, the transformer 100 is a coreless transformer. In the case of a coreless transformer, the primary and secondary side windings (coils) Wp, Ws of the transformer 100 are integrated into an integrated circuit (IC) such that the transformer windings Wp, Ws are placed close enough together to save (omit) the core. The transformer 100 instead may include a core for directing the magnetic flux to the windings Wp, Ws.

A resonant tank of the isolated DC/DC converter may include a capacitor Cfly in series with the primary side 102 of the transformer 100. The leakage inductance Llkg and magnetizing inductance Lm associated with the primary winding Wp of the transformer 100 may form part of the resonant tank.

An inverter 106 coupled to the resonant tank changes a DC input voltage (Vin) to an AC current for energizing the primary side 102 of the transformer 100. In FIG. 1, the inverter 106 is a full-bridge inverter having a first leg 108 and a second leg 110. Each leg 108, 110 has a high-side switch device HS1, HS2 in series with a low-side switch device LS1, LS2. The high-side switch device HS1 of the first leg 108 and the low-side switch device LS2 of the second leg 110 form a first phase ($\phi$1) of the inverter 106. The high-side switch device HS2 of the second leg 110 and the low-side switch device LS1 of the first leg 108 form a second phase ($\phi$2) of the inverter 106. The first and second phases $\phi$1, $\phi$2 are operated in a complementary manner.

A rectifier 112 such as a diode bridge rectifier or synchronous rectifier coupled to a winding Wp on the secondary side 104 of the transformer 100 rectifies energy transferred via the transformer 100 to a power switch device that is generically represented by a capacitor Co in parallel with a resistor Ro. The power switch device may be a GaN power device such as a gate injection transistor (GIT) which is a hybrid-drain HEMT (high electron mobility transistor) with a p-GaN gate that results in a normally-off power switch. GaN power switch devices such as GITs have fast turn-on time and require a constant (gate) current to remain in the on-state.

To this end, a controller 114 operates the inverter 106 in a first mode such that the capacitor Cfly pre-charges to |Vin| before the controller 114 receives a turn ON command for the power switch device, the capacitor Cfly charges to X*|Vin| during a first part of a first switching cycle after the controller 114 receives the turn ON command where X>1, and the capacitor voltage Vcfly resonates with the magnetizing inductance Lm of the primary side 102 of the transformer 100 during a second part of the first switching cycle. The capacitor Cfly may be charged up to or exceeding X=2 during the first part of the first switching cycle after the controller 114 receives the turn ON command, since there is no limit on the capacitor voltage Vcfly when in resonance.

The resonance provided during the second part of the first switching cycle increases the amount of energy that can be transferred to the secondary side 104 of the transformer 100 during a second mode that follows the first mode, ensuring quick turn on of the power switch device. By first pre-charging the capacitor Cfly to |Vin| before the controller 114 receives the turn ON command and then charging the capacitor Cfly to higher than |Vin| during the first part of the first switching cycle after receiving the turn ON command, such high energy is transferred over the transformer 100 that the power switch device may turn on within the first switching cycle.

However, the controller 114 may operate the inverter 106 in the first mode for at least one additional switching cycle. During a first part of each additional switching cycle, the controller 114 operates the inverter 114 to charge the capacitor Cfly to X*|Vin|. During a second part of each additional switching cycle, the controller 114 operates the inverter 106 such that the capacitor voltage Vcfly resonates with the magnetizing inductance Lm of the primary side 102 of the transformer 100.

Figure 2:
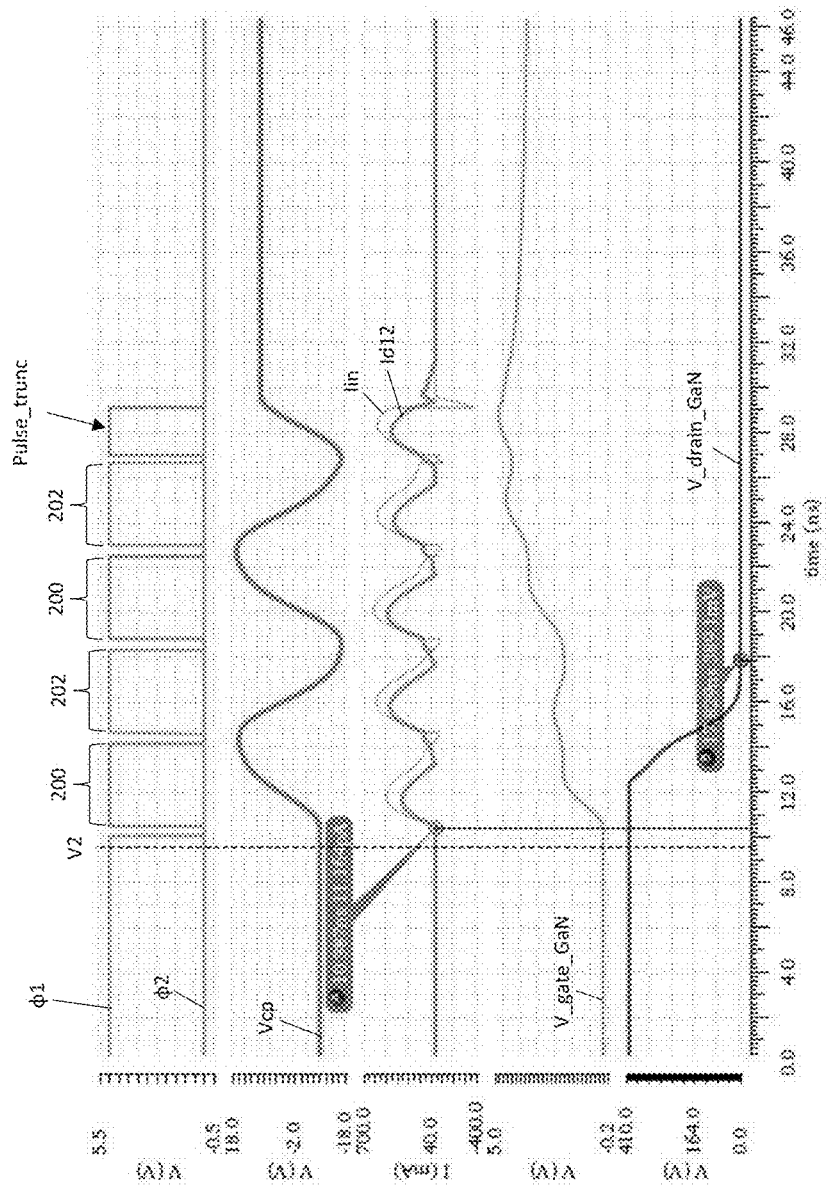
FIG. 2 illustrates a waveform diagram associated with a first mode of operation for the isolated DC/DC converter.

FIG. 2 illustrates various waveforms associated with the first mode of operation. The waveforms include the phase signals $\phi$1, $\phi$2 for the switch devices HS1, HS2, LS1, LS2 of the inverter, the capacitor voltage Vcfly, Iin is the input current to the inverter 106, Id12 is the output current of the rectifier 112, V_gate_GaN is the gate voltage of the power switch device coupled to the rectifier 112, and V_drain_GaN is the drain current of the power switch device. The first mode maximizes charge transfer in a minimum time, to turn on the power switch device as quickly as possible. However, the turn on time of the power switch device instead may be controlled by controlling the capacitor voltage Cfly so as to slow down the di/dt in the power switch device.

In the case of minimum turn on time, and before receiving the turn ON command in the first mode (to the left of 'V2' in FIG. 2), the controller 114 keeps on the high-side switch device HS1/HS2 and the low-side switch device LS2/LS1 of one of the inverter phases $\phi$1, $\phi$2 to pre-charge the capacitor Cfly to |Vin|. For example, the controller 114 turns on and keeps on the switch devices HS1, LS2 for the first phase $\phi$1 of the inverter 106 prior to the turn ON command, by first turning off the switch devices HS2, LS1 for the second phase $\phi$2 of the inverter 106 and then turning on the inverter switch devices HS1, LS2 for the first phase $\phi$1.

In FIG. 2 and before the ON command is received (to the left of 'V2' in FIG. 2), the capacitor voltage Vcfly pre-charges to −10V or −VIN, as an example. In the example illustrated in FIG. 2, the switch devices HS1, LS2 for the first phase $\phi$1 of the inverter 106 remain on as the capacitor Cfly blocks DC current and charges to −VIN. When the turn ON command is received, during the first part 200 of the first switching cycle in the first mode the controller 114 deactivates (turns off) the phase (e.g., $\phi$1; switch devices HS1, LS2) used to pre-charge the capacitor Cfly to |Vin| and then activates (turns on) the complementary phase (e.g., $\phi$2; switch devices HS2, LS1).

For the second half 202 of the first switching cycle after receiving the ON command, instead of turning off the inverter switch devices HS1, HS2, LS1, LS2 when Vcfly reaches |Vin|, the controller 114 deactivates the phase (e.g., $\phi$2; switch devices HS2, LS1) used during the first part 200 of the first switching cycle and then activates the complementary phase (e.g., $\phi$1; switch devices HS1, LS2). In this way, when the complementary pair of switch devices (e.g., HS2, LS1 for the second inverter phase $\phi$2) are subsequently turned on in response to the turn ON command (to the right of 'V2' in FIG. 2), a voltage of 2*|VIN| in this example appears across the terminals of the primary side winding Wp of the transformer 100, instead of just |Vin| as in the case of conventional full-bridge converter control. More generally, by charging the capacitor Cfly to X*|VIN| where X>1, more current is induced into the gate of the power switch device that is coupled to the secondary side winding Ws of the transformer 100 by the rectifier 112. This allows the capacitor voltage Vcfly to resonate with the magnetizing inductor Lm, and thus be charged by the magnetizing inductor Lm, so that the capacitor voltage Vcfly exceeds |Vin|.

In one embodiment, the controller 114 determines when to transition from the first part 200 of the first switching cycle to the second part of the first switching cycle 202 in the first mode based on the capacitor voltage Vcfly. For example, the controller 114 may transition from the first part 200 of the first switching cycle to the second part 202 of the first switching cycle when the capacitor voltage Vcfly is at or near a peak value Vpeak. When this condition is satisfied, the controller 114 turns off the pair of inverter switch devices (e.g., $\phi$1; switch devices HS1, LS2) that were on and then turns on the complementary pair of inverter switch devices (e.g., $\phi$2; switch devices HS2, LS1).

Such switching of the inverter phases φ1, φ2 permits significantly more charge to be transmitted to the secondary side 104 of the transformer 100, which is equivalent to Vpeak*Cfly. The first two (2) current pulses of Id12 in the first switching cycle transmit so much charge that, in most cases, the power switch device turns on. To fully charge the gate of the power switch device, the controller 114 may implement a second switching cycle with the first and second parts 200, 202 at resonance. The controller 114 may implement even more (e.g., 3 to 5) switching cycles at resonance to ensure full turn on of any power switch device coupled to the secondary side winding Ws of the transformer 100 by the rectifier 112.

In the second mode after the first mode, the controller 114 operates the inverter 106 at a lower switching frequency (than in the first mode) to maintain a constant current that is injected into the gate of the power switch device, to maintain the power switch device in the on-state. As explained above, the controller 114 operates the first and second phases φ1, φ2 of the inverter 106 in a complementary manner in both the first mode and the second mode. Logic-level signals from the controller 114 are provided to driver circuitry 116 that converts the logic-level control signals into appropriate phase signals φ1, φ2 for driving the gates of the respective switch devices HS1, HS2, LS1, LS2 of the inverter 106.

Figure 3:
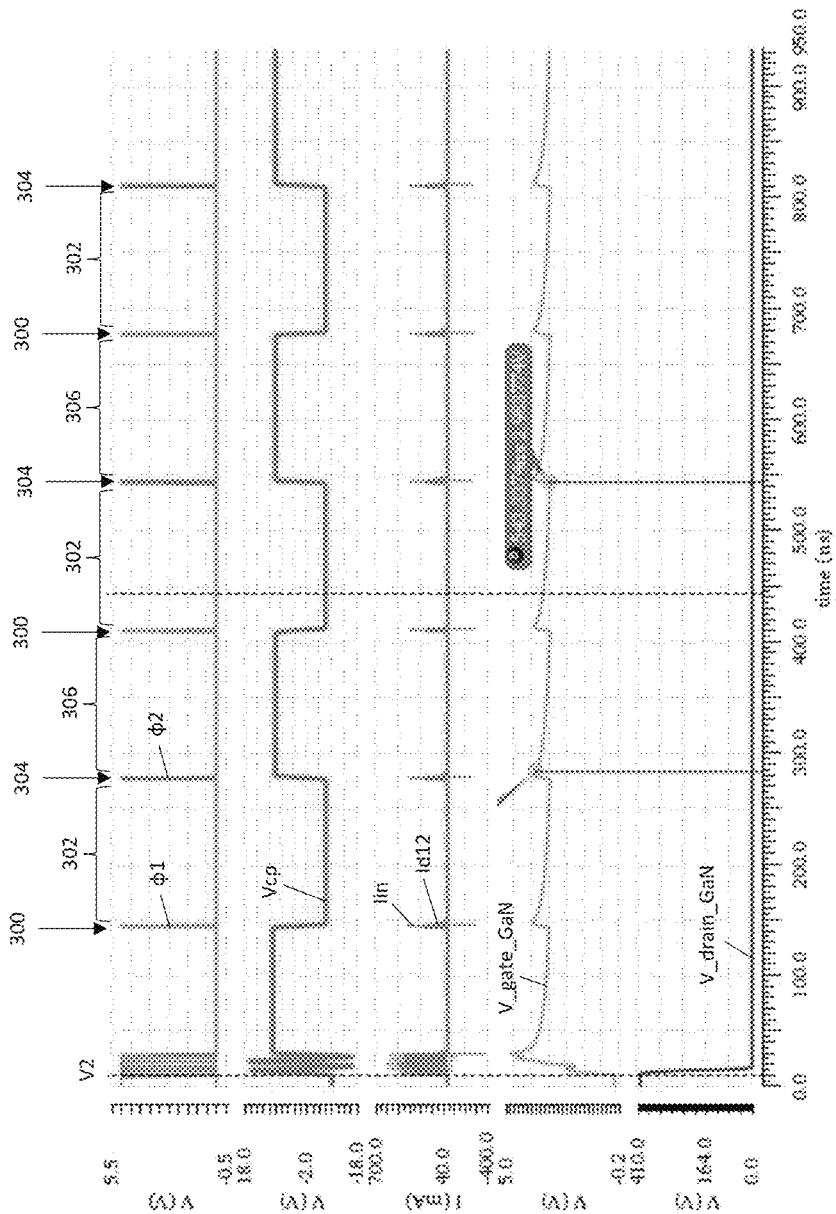
FIG. 3 illustrates a waveform diagram associated with a second mode of operation for the isolated DC/DC converter.

FIG. 3 illustrates the same waveforms as FIG. 2, but for the second mode of operation. Once the power switch device coupled to the secondary side winding Ws of the transformer 100 by the rectifier 112 is turned on, the power switch device requires a constant current source to remain on. To this end, the controller 114 switches to the second mode of operation where the switching frequency Fsw is reduced (e.g., to about 4 MHz in FIG. 3). As shown in FIG. 2, the first pulse 'Pulse_trun' after the first two (2) switching cycles is turned off early (truncated). The controller 114 controls both the voltage Vcfly to which the capacitor Cfly is charged and the switching frequency Fsw to generate a constant current source in the second mode of operation that is independent of Vin. FIG. 3 illustrates this principle, as demonstrated by the relatively constant current Id12 which is applied to the gate of the power switch device. The controller 114 may implement a constant current source like function without using feedback by taking advantage of the charge transfer capability of the isolated DC/DC converter topology described herein, where the current transferred to the gate of the power switch device is given by:

$$Id12 \cong 4 \cdot Vcfly \cdot Cfly \cdot Fsw \quad (1)$$

In FIG. 1, the controller 114 trims an oscillator 118 in the first mode to tune the switching frequency for the corresponding clock signal 'CLK'. In the second mode, the controller 114 uses a minimum clock cycle to implement a constant current source like function such that the capacitor Cfly fully pre-charges to Vin prior to charge transfer to the secondary side 104 of the transformer 100. For example, in the second mode and after the power switch device is turned on, the controller 114 may reduce the switching frequency from about 100 MHz (for the turn on phase) to about 1 to 5 MHz (for the keep on phase), and operates at a constant frequency and constant Cfly charge voltage.

Once the power switch device turns on, the power switch device requires a constant current source into the gate to remain on. By charging the capacitor Cfly and controlling the switching frequency Fsw to be constant in the second mode of operation, a constant current source like function results which maintains the power switch device in the on-state. The maximum charge transfer per cycle is given by:

$$QCycle \cong 4 \cdot Vcfly \cdot Cfly \quad (2)$$

and the current transferred to the gate of the power switch device is given equation (1).

By controlling the voltage Vcfly on the capacitor Cfly and the switching frequency Fsw, the controller 114 generates a constant current source to maintain the power switch device in the on-state. The capacitor voltage Vcfly is kept constant by adapting the turn off time of the switch devices HS1, Ls1 or HS2, LS1 for the first or second phase φ1 or φ2 of the inverter 106 to the input voltage Vin. As shown in FIG. 3, each switching cycle in the second (constant current) mode of operation includes a short on (active) period 300 for the first inverter phase φ1 (inverter switch devices HS1, LS2 are on and inverter switch devices HS2, LS1 are off), followed by a long off (inactive) period 302 for both inverter phases φ1, φ2 (all inverter switch devices HS1, HS2, LS1, LS2 are off), followed by a short on (active) period 304 for the second inverter phase φ2 (inverter switch devices HS2, LS1 are on and inverter switch devices HS1, LS2 are off), followed by another long off (inactive) period 306 for both inverter phases φ1, φ2 (all inverter switch devices HS1, HS2, LS1, LS2 are off). The frequency may be selected so that the gate capacitance of the power switch device is adequately replenished.

Figure 4:
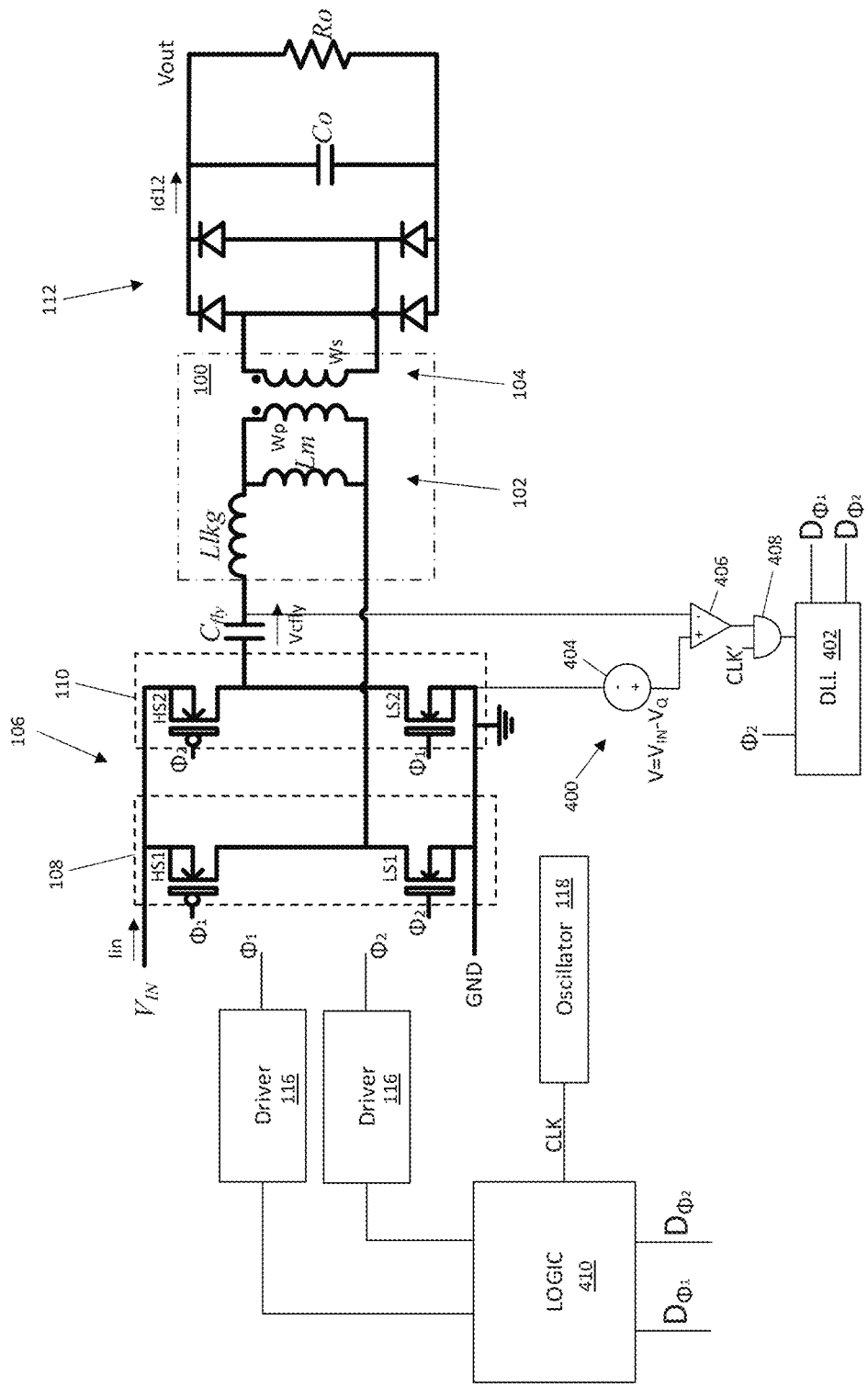
FIG. 4 illustrates a schematic diagram of another embodiment of the isolated DC/DC converter.

FIG. 4 illustrates another embodiment of the isolated DC/DC converter. In FIG. 4, the controller 114 includes a peak detector 400 and a delay-locked loop (DLL) 402 for implementing the constant current source like function in the second mode of operation. The peak detector 400 determines when the capacitor voltage Vcfly reaches the peak value Vpeak. The DLL 402 maintains an on-phase for the inverter 106 (φ1 or φ2) in the second mode.

To generate a constant current source that is independent from the input voltage Vin, the peak detector 400 includes a voltage controlled voltage source 404 that generates a voltage V=Vin−Vq. The voltage Vq is the desired voltage at which the switch devices HS1, LS1 or HS2, LS2 of the corresponding inverter phase φ1, φ2 are turned off. A comparator 406 compares the output of the voltage controlled voltage source 404 to the capacitor voltage Vcfly. The comparator output triggers when the capacitor voltage Vcfly drops below the voltage V. The comparator output is gated by a logic gate 408 which triggers the DLL 402 when both the compactor output and a clock signal input 'CLK' are active, thus limiting the amount of charge transferred per cycle as follows:

$$QCycle \cong 4 \cdot Vq \cdot Cfly. \quad (3)$$

The DLL outputs Dφ1, Dφ2 are input to the control logic 410 that generates the gate driver control signals.

This approach provides significantly more charge per cycle than a full-bridge topology with the same components but under conventional control and the size of the transformer 100 can be reduced to about half the size, which saves a significant amount of area and still outperforms in minimizing the turn on time and efficiency during the on phase. The efficiency during the on phase is significantly increased since the operating frequency is reduced and no current is absorbed from the primary side 102 during the different current pulses.

Figure 5:
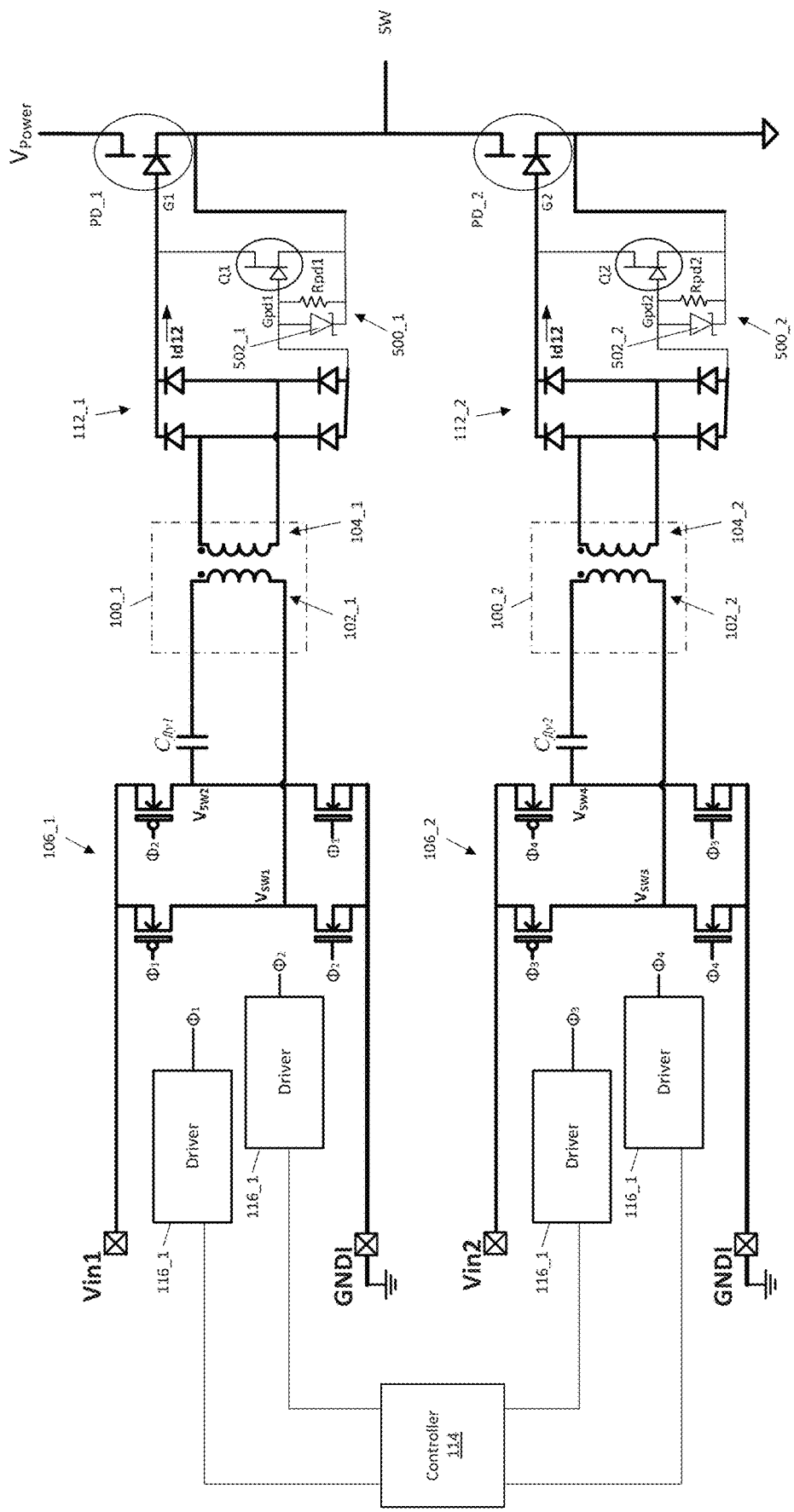
FIG. 5 illustrates a schematic diagram of an embodiment of a power electronics system that includes an additional isolated DC/DC converter.

FIG. 5 illustrates an embodiment of a power electronics system that includes an additional isolated DC/DC converter. In FIG. 5, the isolated DC/DC converter includes an additional transformer 100_2 having a primary side 102_2 and a secondary side 104_2, an additional rectifier 112_2 coupled between the secondary side 104_2 of the additional transformer 100_2 and a gate G2 of an additional power switch device PD_2 connected in series at a switch node 'SW' with the power switch device PD_1 between a power node 'Vpower' and a reference node such as ground. An additional inverter 106_2 changes the corresponding input voltage Vin2 to an AC current for energizing the primary side 102_2 of the additional transformer 100_2. An additional capacitor Cfly2 is in series with the primary side 102_2 of the additional transformer 100_1.

The controller 114 operates the additional inverter 106_2 in the first mode such that the additional capacitor Cfly2 pre-charges to |Vin2| before the controller 114 receives a turn ON command for the additional power switch device PD_2, the additional capacitor Cfly2 charges to Z*|Vin2| during the first part 200 of the first switching cycle after the controller 114 receives the turn ON command for the additional power switch device PD_2 where Z>1, and the voltage Vcfly2 of the additional capacitor Cfly2 resonates with the magnetizing inductance of the primary side 102_2 of the additional transformer 100_2 during the second part 202 of the first switching cycle, as previously explained herein.

The controller 114 also operates the additional inverter 106_2 in the second (constant current) mode that follows the first mode of the additional inverter 106_2, as previously explained herein. This includes operating the additional inverter 106_2 at a lower switching frequency in the second mode than in the first mode. Also, the additional power switch device PD_2 remains on when the controller 114 operates the additional inverter 106_2 in the second mode.

In one embodiment, both power switch devices PD1, PD2, are gate injection transistors (GITs) having a non-isolated p-GaN gate structure G1, G2. According to this embodiment, the controller 114 controls the switching frequency of each inverter 106_1, 106_2 and the voltage Vcfly1, Vcfly2 across the respective capacitors Cfly1, Cfly2 in the second mode to generate a constant current source for energizing the primary side 102_1, 102_2 of the corresponding transformer 100_1, 100_2, as previously explained herein. The respective rectifier 112_1, 112_2 converts energy transferred to the secondary side 104_1, 104_2 of the corresponding transformer 100_1, 100_2 from the constant current source in the second mode into a current Id12 that is injected into the non-isolated p-GaN gate structure G1, G2 to maintain the GIT in the on-state.

In FIG. 5, each inverter stage has a pulldown switch device Q1, Q2 that turns off the corresponding power switch device PD1, PD2. In one embodiment, the pulldown switch devices Q1, Q2 are normally-on GaN HEMTs. A pulldown control circuit 500_1, 500_2 provides a gate-to-source voltage for the corresponding normally-on pulldown transistor Q1, Q2. For example, the pulldown control circuit 500_1, 500_2 may apply a negative voltage to the gate Gpd1, Gpd2 of the corresponding normally-on pulldown transistor Q1, Q2 when a turn-on voltage is applied to the gate G1, G2 of the power switch device PD_1, PD_2, and does so autonomously, i.e., no separate external signals are required to control the pulldown control circuit 500_1, 500_2. The pulldown control circuit 500_1, 500_2 also autonomously discharges the negative voltage when the turn-on voltage is not applied to the gate G1, G2 of the power switch device PD_1, PD_2.

In one embodiment, the pulldown control circuit 500_1, 500_2 includes a voltage clamp 502_1, 502_2 and a pulldown resistor Rpd1, Rpd2. The voltage clamp 502_1, 502_2 generates a pulldown gate-to-source voltage that is below the negative threshold voltage required to turn off the corresponding normally-on pulldown transistor Q1, Q2, during intervals when the normally-off power switch device PD_1, PD_2 is on (conducting). The voltage clamp 502_1, 502_2 may be, or be modelled as, a diode having a threshold voltage. For example, the voltage clamp 502_1, 502_2 may be, or be modelled as, a Zener diode as indicated in FIG. 5.

Figure 6:
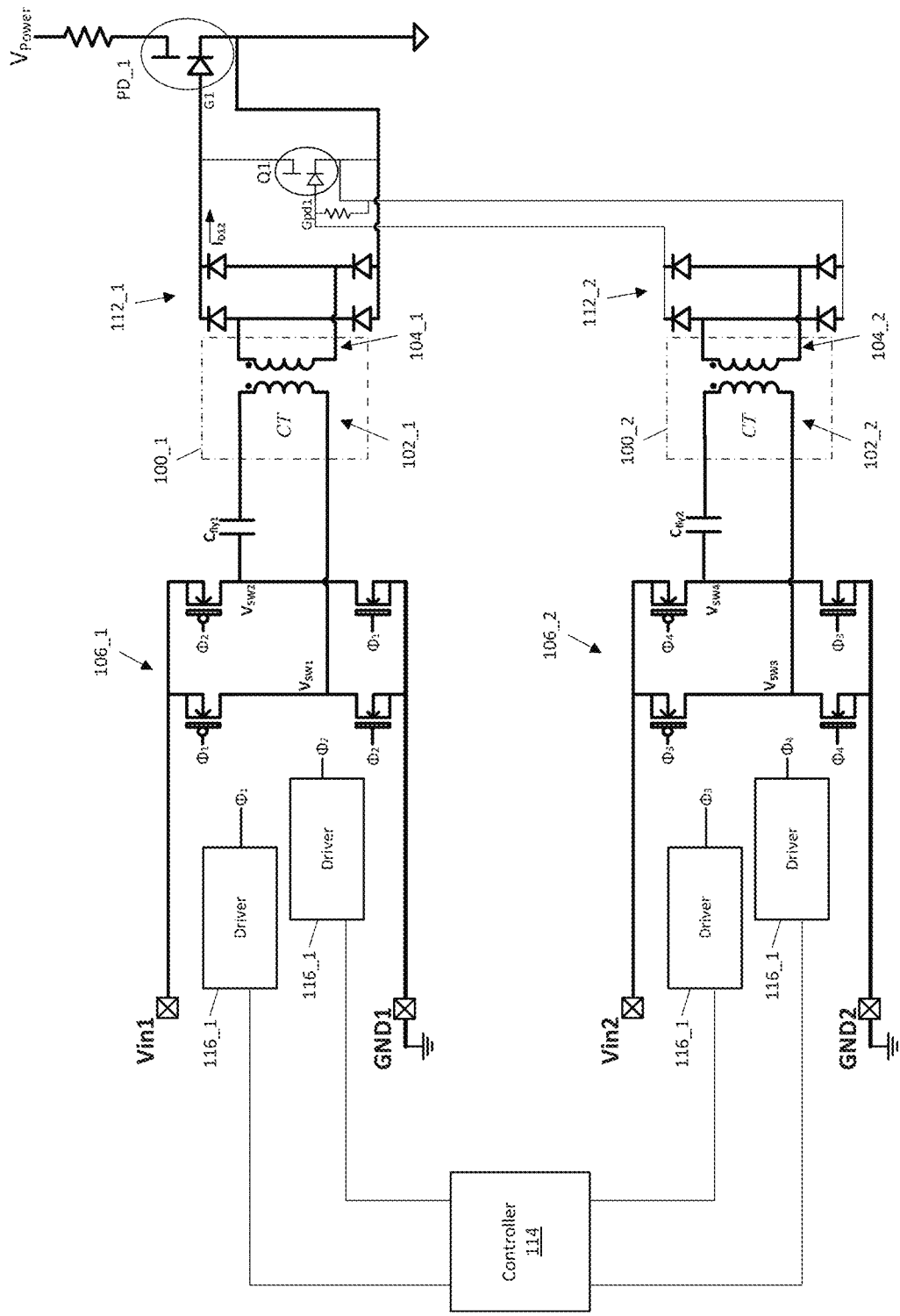
FIG. 6 illustrates a schematic diagram of another embodiment of the power electronics system with two isolated DC/DC converter.

FIG. 6 illustrates another embodiment of the power electronics system with two isolated DC/DC converter. In FIG. 6, the additional rectifier 112_2 is coupled between the secondary side 104_2 of the additional transformer 100_2 and the gate Gpd1 of the pulldown switch device Q1 for the first power switch device PD_1. The controller 114 operates the additional inverter 106_2 in the first mode such that the additional capacitor Cfly2 pre-charges to |Vin2| before the controller 114 receives a turn ON command for the pulldown switch device PD_1, the additional capacitor Cfly2 charges to Y*|Vin2| during the first part 200 of the first switching cycle after the controller 114 receives the turn ON command for the pulldown switch device PD_1 where Y>1, and the voltage Vcfly2 of the additional capacitor Cfly2 resonates with a magnetizing inductance of the primary side 102_2 of the additional transformer 100_2 during the second part 202 of the first switching cycle, as previously explained herein.

In the second mode, the controller 114 operates the additional inverter 106_2 at a lower switching frequency than in the first mode. The pulldown switch device Q1 for the first power switch device PD_1 remains on when the controller 114 operates the additional inverter 106_2 in the second mode.

Figure 7:
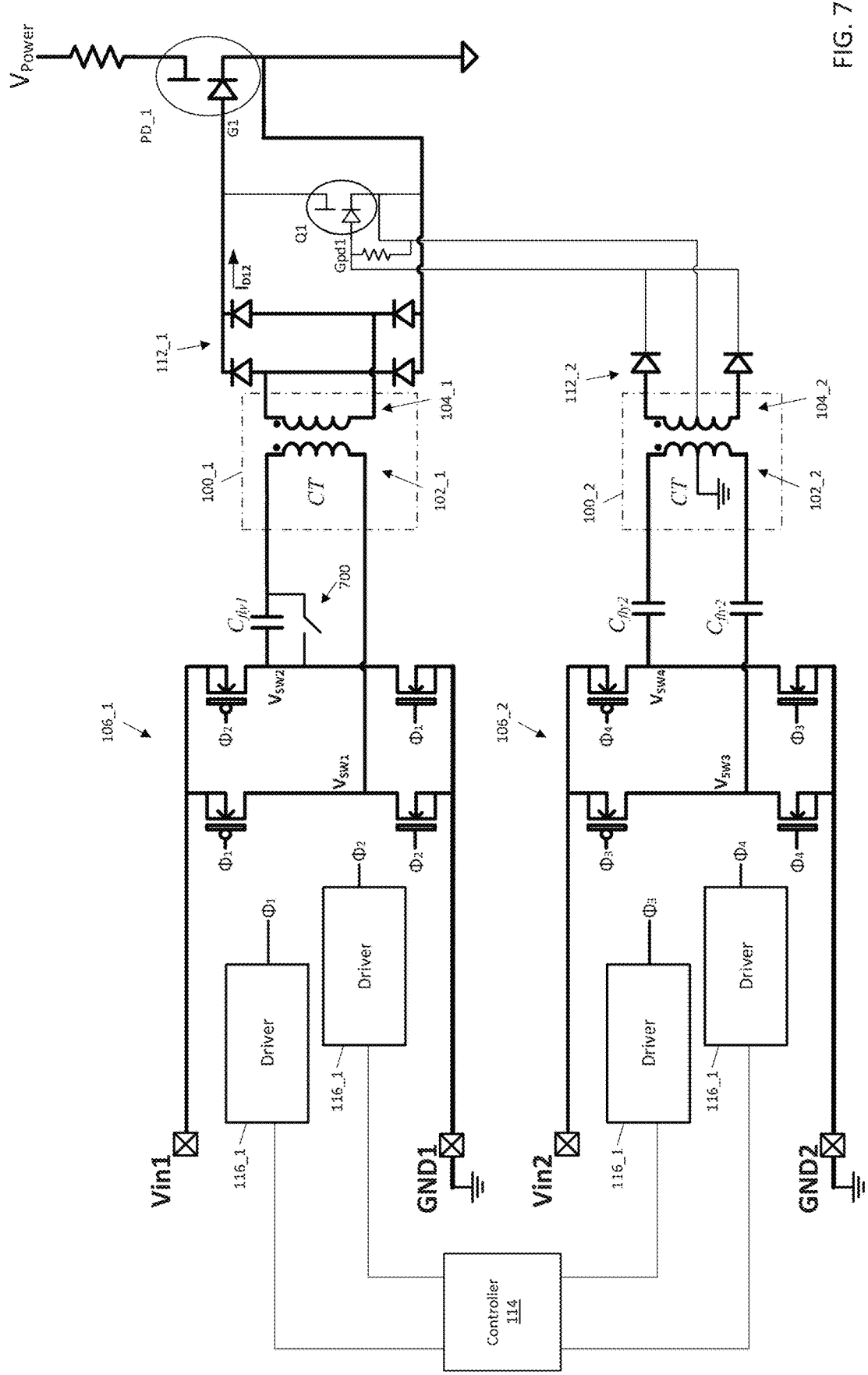
FIG. 7 illustrates a schematic diagram of another embodiment of the power electronics system with two isolated DC/DC converter.

FIG. 7 illustrates another embodiment of the isolated DC/DC converter with two isolated DC/DC converters. The embodiment in FIG. 7 is similar to the embodiment in FIG. 6. However, in FIG. 7, a switch device 700 is coupled across the resonant capacitor Cfly1 on the primary side 102_1 of the first transformer 100_1 and a capacitor Cfly2 is coupled to each terminal of the primary side winding of the second transformer 100_2. One of the two capacitors Cfly2 coupled to the primary side winding of the second transformer 100_2 may be omitted.

Figure 8:
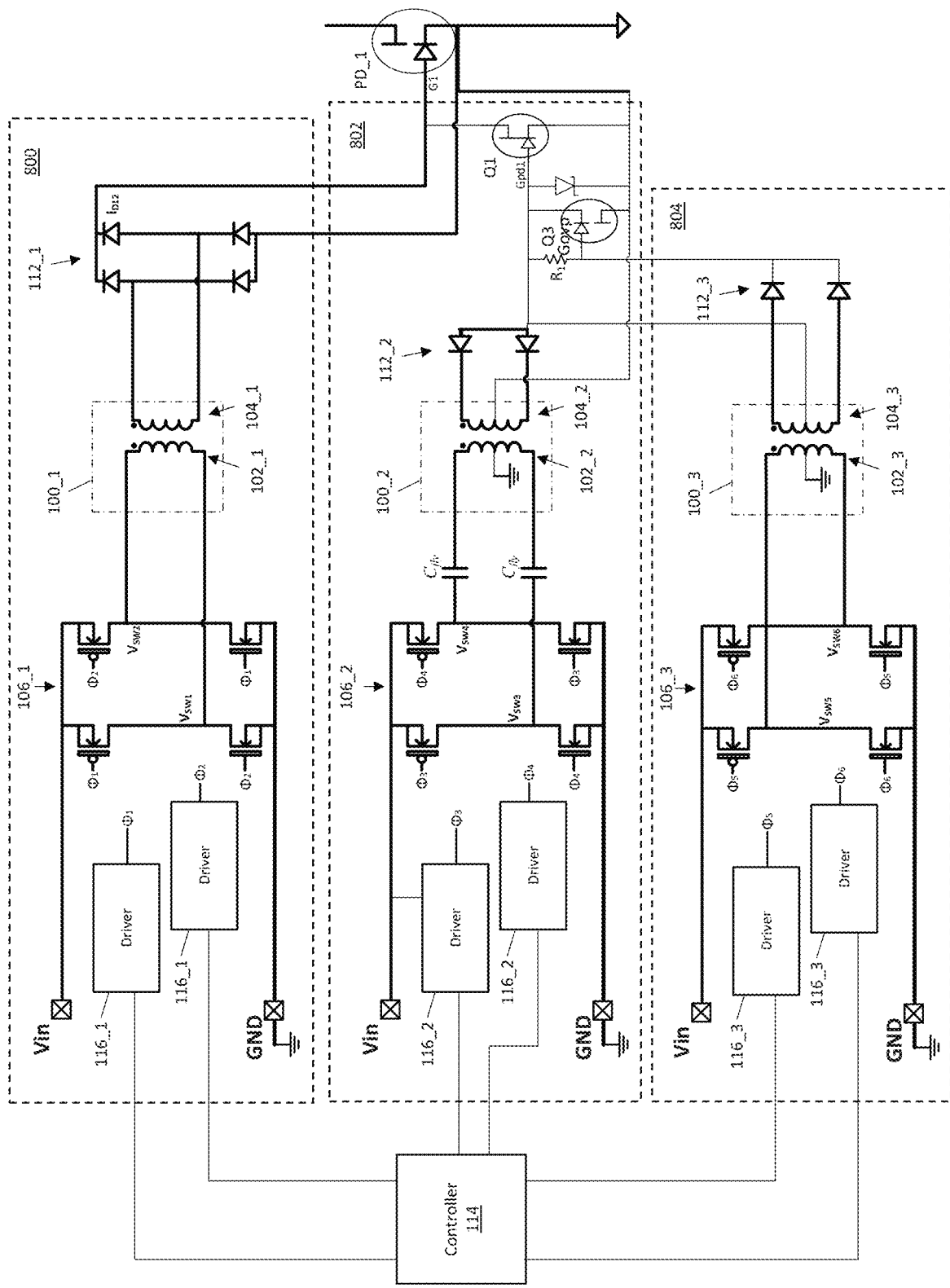
FIGS. 8 through 10 illustrate schematic diagrams of embodiments of a triple converter/transformer system that employs the control approach described herein.
Figure 9:
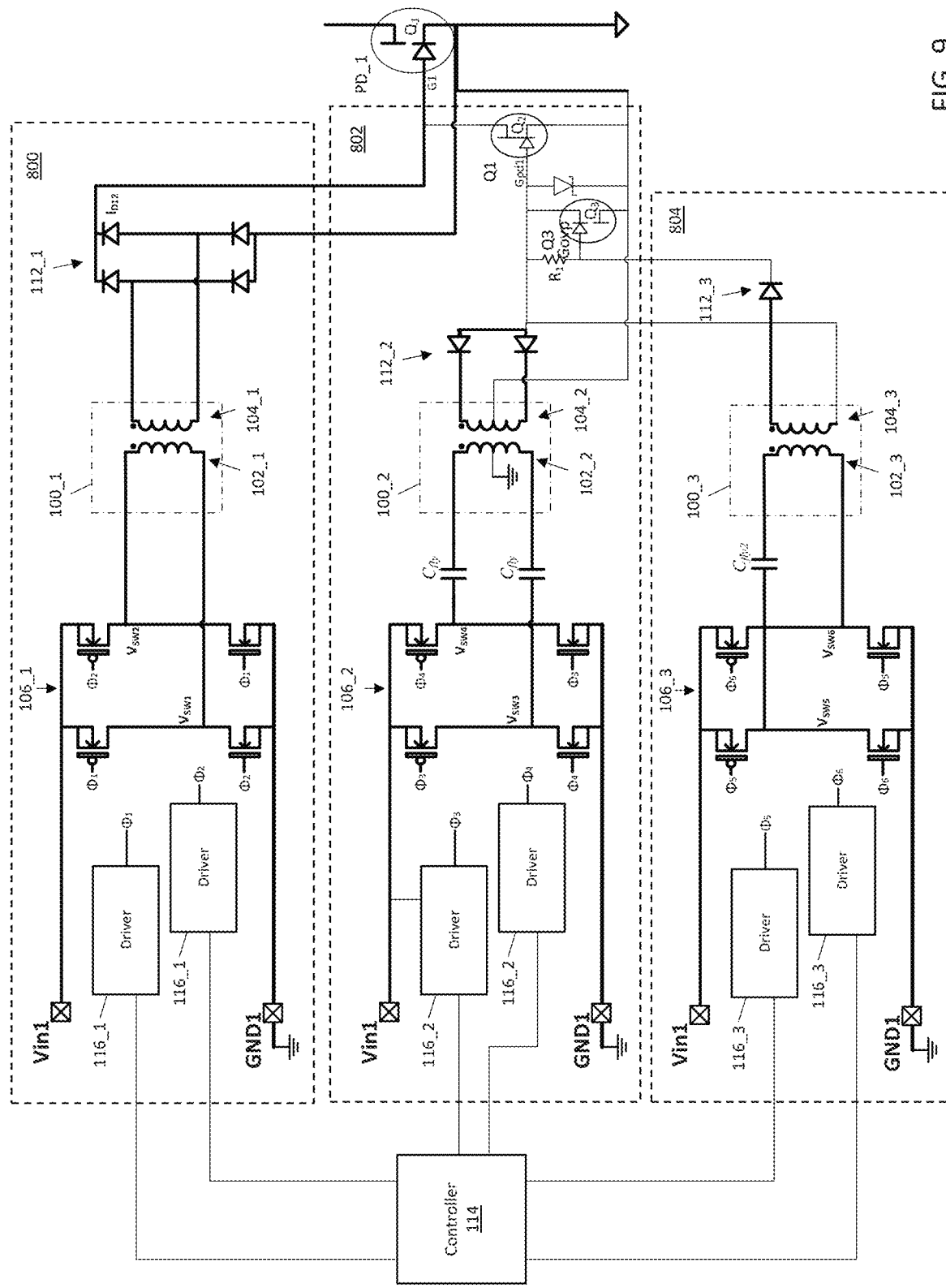
Figure 10:
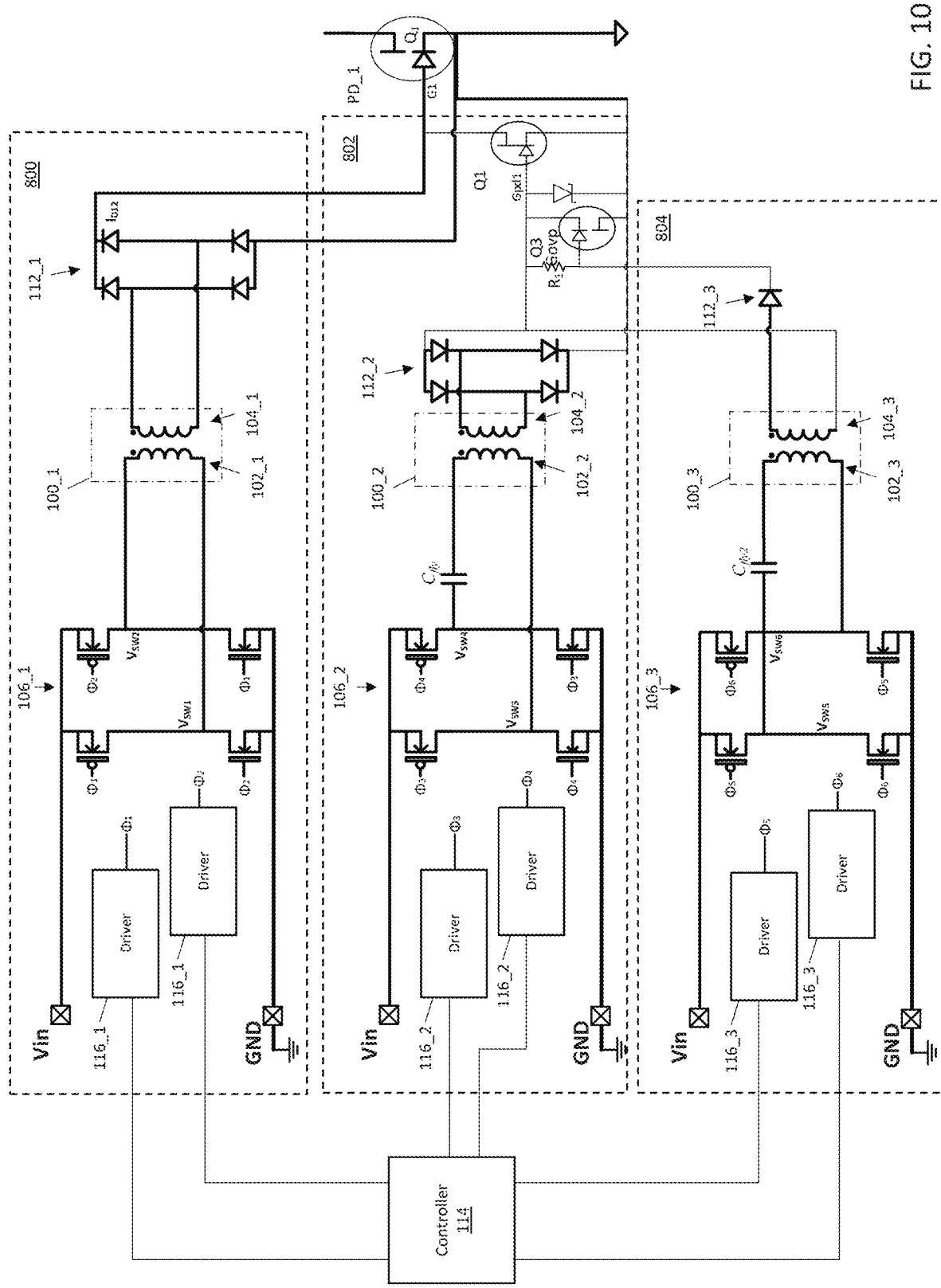

FIGS. 8 through 10 illustrate embodiments of a triple converter/transformer system that employs the control approach described herein.

FIG. 8 illustrates a power electronics system that includes a (main) power switch device PD_1, a pulldown switch device Q1 that turns off the power switch device PD_1 when the pulldown switch device Q1 is on, a flyback converter 800 that drives a gate G1 of the power switch device PD_1, and an isolated DC/DC converter 802. The isolated DC/DC converter 802 includes a transformer 100_2 having a primary side 102_2 and a secondary side 104_2, a rectifier 112_2 coupled between the secondary side 104_2 of the transformer 100_2 and the gate Gpd1 of the pulldown switch device Q1, an inverter 106_2 that changes the DC input voltage (Vin) to an AC current for energizing the primary side 102_2 of the transformer 100_2, and at least one capacitor Cfly in series with the primary side 102_2 of the transformer 100_2.

The controller 114 operates the inverter 106_2 of the isolated DC/DC converter 802 in the first mode such that the capacitor Cfly2 pre-charges to |Vin| before the controller 114 receives a turn ON command for the pulldown switch device PD_1, the capacitor Cfly2 charges to X*|Vin| during the first part 200 of the first switching cycle after the controller 114 receives the turn ON command where X>1, and the capacitor voltage Vcfly2 resonates with the magnetizing inductance of the primary side 102_2 of the transformer 100_2 during the second part 202 of the first switching cycle, as previously described herein. The controller 114 may operate the inverter 106_2 of the isolated DC/DC converter 802 in the second mode that follows the first mode, by operating the inverter 106_2 of the isolated DC/DC converter 802 at a lower switching frequency in the second mode than in the first mode. The pulldown switch device Q1 for the main power switch device PD_1 remains on when the controller 114 operates the inverter 106_2 of the isolated DC/DC converter 802 in the second mode. The controller 114 may operate the flyback converter 800 as a standard flyback converter.

The power electronics system may further include a failsafe device Q3 such as a normally-off GaN HEMT that protects the pulldown switch device Q1 for the main power switch device PD_1 from overvoltage. The gate Govp of the failsafe device Q3 may be coupled to the same terminal of the rectifier 112_2 of the isolated DC/DC converter 802 as the gate Gpd1 of the pulldown switch device Q1, e.g., through a resistor R1.

The power electronics system may also include an additional isolated DC/DC converter 804 that includes an additional transformer 100_3 having a primary side 102_3 and a secondary side 100_3, an additional rectifier 112_3 coupled between the secondary side 104_3 of the additional transformer 100_3 and the gate Govp of the failsafe device Q3, and an additional inverter 106_3 that changes Vin to an AC current for energizing the primary side 102_3 of the additional transformer 100_3. The transformer 100_2, 100_3 of both isolated DC/DC converters 802, 804 have a center tapped configuration in FIG. 8

In FIG. 9, the rectifier 112_3 of the additional isolated DC/DC converter 804 has a single rectification diode. Also, the transformer 100_3 of the additional isolated DC/DC converter 804 does not have a center tapped configuration and an additional capacitor Cfly2 is in series with the primary side 102_3 of the additional transformer 100_3. According to this embodiment, the controller 114 operates the additional inverter 106_3 of the additional isolated DC/DC converter 804 in the first mode such that the additional capacitor Cfly2 of the additional isolated DC/DC converter 804 pre-charges to |Vin| before the controller 114 receives a turn ON command for the failsafe device Q3, the additional capacitor Cfly2 charges to Y*|Vin| during the first part 200 of the first switching cycle after the controller 114 receives the turn ON command for the failsafe device Q3 where Y>1, and the voltage Vcfly2 of the additional capacitor Cfly2 resonates with the magnetizing inductance of the primary side 102_3 of the additional transformer 100_3 during the second part 202 of the first switching cycle. The controller 114 may also operate the additional inverter 106_3 of the additional isolated DC/DC converter 804 in the second mode that follows the first mode, by operating the additional inverter 106_3 at a lower switching frequency in the second mode than in the first mode. The failsafe device Q3 remains on when the controller 114 operates the additional inverter 106_3 of the additional isolated DC/DC converter 804 in the second mode.

In FIG. 10, the transformer 100_2 of the first isolated DC/DC converter 802 does not have a center tapped configuration and the rectifier 112_2 of the first isolated DC/DC converter 802 has a full bridge configuration.

Although the present disclosure is not so limited, the following numbered examples demonstrate one or more aspects of the disclosure.

Example 1. An isolated DC/DC converter, comprising: a transformer having a primary side and a secondary side; an inverter configured to change a DC input voltage (Vin) to an AC current for energizing the primary side of the transformer; a capacitor in series with the primary side of the transformer; and a controller configured to operate the inverter in a first mode such that the capacitor pre-charges to |Vin| before the controller receives a turn ON command, the capacitor charges to X*|Vin| during a first part of a first switching cycle after the controller receives the turn ON command where X>1, and the capacitor voltage resonates with a magnetizing inductance of the primary side of the transformer during a second part of the first switching cycle.

Example 2. The isolated DC/DC converter of example 1, wherein the inverter is a full-bridge inverter comprising a first leg and a second leg, wherein each leg comprises a high-side switch device in series with a low-side switch device, wherein the high-side switch device of the first leg and the low-side switch device of the second leg form a first phase of the inverter, wherein the high-side switch device of the second leg and the low-side switch device of the first leg form a second phase of the inverter, and wherein the controller is configured to operate the first and second phases in a complementary manner.

Example 3. The isolated DC/DC converter of example 2, wherein before receiving the turn ON command in the first mode, the controller is configured to keep on the high-side switch device and the low-side switch device of one of the phases to pre-charge the capacitor to |Vin|.

Example 4. The isolated DC/DC converter of example 2 or 3, wherein during the first part of the first switching cycle in the first mode, the controller is configured to deactivate the phase used to pre-charge the capacitor to |Vin| and then activate the complementary phase.

Example 5. The isolated DC/DC converter of any of examples 2 through 4, wherein during the second part of the first switching cycle in the first mode, the controller is configured to deactivate the phase used during the first part of the first switching cycle and then activate the complementary phase.

Example 6. The isolated DC/DC converter of any of examples 1 through 5, wherein the controller is configured to operate the inverter in the first mode for at least one additional switching cycle, wherein during a first part of each additional switching cycle, the controller is configured to operate the inverter to charge the capacitor to X*|Vin|, and wherein during a second part of each additional switching cycle, the controller is configured to operate the inverter such that the capacitor voltage resonates with the magnetizing inductance of the primary side of the transformer.

Example 7. The isolated DC/DC converter of any of examples 1 through 6, wherein the controller is configured to operate the inverter in a second mode that follows the first mode, wherein the inverter is operated at a lower switching frequency in the second mode than in the first mode.

Example 8. The isolated DC/DC converter of example 7, wherein the controller is configured to control the switching frequency and the voltage across the capacitor in the second mode to generate a constant current source that is independent of Vin.

Example 9. The isolated DC/DC converter of example 7 or 8, wherein the controller comprises: a peak detector configured to determine when the capacitor voltage reaches a peak value; and a delay-locked loop configured to maintain an on-phase for the inverter in the second mode.

Example 10. The isolated DC/DC converter of any of examples 7 through 9, wherein the controller is configured to trim an oscillator in the first mode to tune the switching frequency in the first mode, and wherein the controller is configured to use a minimum clock cycle in the second mode such that the capacitor fully pre-charges to Vin prior to charge transfer to the secondary side of the transformer.

Example 11. The isolated DC/DC converter of any of examples 1 through 10, wherein in the first mode, the controller is configured to determine when to transition from the first part of the first switching cycle to the second part of the first switching cycle based on the capacitor voltage.

Example 12. The isolated DC/DC converter of example 11, wherein the controller is configured to transition from the first part of the first switching cycle to the second part of the first switching cycle when the capacitor voltage is at or near a peak value.

Example 13. The isolated DC/DC converter of any of examples 1 through 12, further comprising: a rectifier coupled between the secondary side of the transformer and a gate of a power switch device, wherein the power switch device is configured to turn on when the controller operates the inverter in the first mode.

Example 14. The isolated DC/DC converter of example 13, wherein the controller is configured to operate the inverter in a second mode that follows the first mode, wherein the inverter is operated at a lower switching frequency in the second mode than in the first mode, and wherein the power switch device is configured to remain on when the controller operates the inverter in the second mode.

Example 15. The isolated DC/DC converter of example 14, wherein the power switch device is a gate injection transistor having a non-isolated p-GaN gate structure, wherein the controller is configured to control the switching frequency of the inverter and the voltage across the capacitor in the second mode to generate a constant current source for energizing the primary side of the transformer, and wherein the rectifier is configured to convert energy transferred to the secondary side of the transformer from the constant current source in the second mode into a current that is injected into the non-isolated p-GaN gate structure to maintain the gate injection transistor in the on-state.

Example 16. The isolated DC/DC converter of any of examples 13 through 15, further comprising: an additional transformer having a primary side and a secondary side; a pulldown switch device configured to turn off the power switch device; an additional rectifier coupled between the secondary side of the additional transformer and a gate of the pulldown switch device; an additional inverter configured to change Vin to an AC current for energizing the primary side of the additional transformer; and an additional capacitor in series with the primary side of the additional transformer, wherein the controller is configured to operate the additional inverter in a first mode such that the additional capacitor pre-charges to |Vin| before the controller receives a turn ON command for the pulldown switch device, the additional capacitor charges to Y*|Vin| during a first part of a first switching cycle after the controller receives the turn ON command for the pulldown switch device where Y>1, and the voltage of the additional capacitor resonates with a magnetizing inductance of the primary side of the additional transformer during a second part of the first switching cycle.

Example 17. The isolated DC/DC converter of example 16, wherein the controller is configured to operate the additional inverter in a second mode that follows the first mode of the additional inverter, wherein the additional inverter is operated at a lower switching frequency in the second mode than in the first mode, and wherein the pulldown switch device is configured to remain on when the controller operates the additional inverter in the second mode.

Example 18. The isolated DC/DC converter of any of examples 13 through 17, further comprising: an additional transformer having a primary side and a secondary side; an additional rectifier coupled between the secondary side of the additional transformer and a gate of an additional power switch device connected in series with the power switch device; an additional inverter configured to change Vin to an AC current for energizing the primary side of the additional transformer; and an additional capacitor in series with the primary side of the additional transformer, wherein the controller is configured to operate the additional inverter in a first mode such that the additional capacitor pre-charges to |Vin| before the controller receives a turn ON command for the additional power switch device, the additional capacitor charges to Z*|Vin| during a first part of a first switching cycle after the controller receives the turn ON command for the additional power switch device where Z>1, and the voltage of the additional capacitor resonates with a magnetizing inductance of the primary side of the additional transformer during a second part of the first switching cycle.

Example 19. The isolated DC/DC converter of example 18, wherein the controller is configured to operate the additional inverter in a second mode that follows the first mode of the additional inverter, wherein the additional inverter is operated at a lower switching frequency in the second mode than in the first mode, and wherein the additional power switch device is configured to remain on when the controller operates the additional inverter in the second mode.

Example 20. The isolated DC/DC converter of example 19, wherein the additional power switch device is a gate injection transistor having a non-isolated p-GaN gate structure, wherein the controller is configured to control the switching frequency of the additional inverter and the voltage across the additional capacitor in the second mode of the additional inverter to generate a constant current source for energizing the primary side of the additional transformer, and wherein the additional rectifier is configured to convert energy transferred to the secondary side of the additional transformer from the constant current source in the second mode into a current that is injected into the non-isolated p-GaN gate structure to maintain the gate injection transistor in the on-state.

Example 21. A power electronics system, comprising: a power switch device; a pulldown switch device configured to turn off the power switch device when the pulldown switch device is on; a flyback converter configured to drive a gate of the power switch device; and an isolated DC/DC converter comprising: a transformer having a primary side and a secondary side; a rectifier coupled between the secondary side of the transformer and a gate of the pulldown switch device; an inverter configured to change a DC input voltage (Vin) to an AC current for energizing the primary side of the transformer; a capacitor in series with the primary side of the transformer; and a controller configured to operate the inverter in a first mode such that the capacitor pre-charges to |Vin| before the controller receives a turn ON command for the pulldown switch device, the capacitor charges to X*|Vin| during a first part of a first switching cycle after the controller receives the turn ON command where X>1, and the capacitor voltage resonates with a magnetizing inductance of the primary side of the transformer during a second part of the first switching cycle.

Example 22. The power electronics system of example 21, wherein the controller is configured to operate the inverter in a second mode that follows the first mode, wherein the inverter is operated at a lower switching frequency in the second mode than in the first mode, and wherein the pulldown switch device is configured to remain on when the controller operates the inverter in the second mode.

Example 23. The power electronics system of example 21 or 22, further comprising: a failsafe device configured to protect the pulldown switch device from overvoltage; and an additional isolated DC/DC converter comprising: an additional transformer having a primary side and a secondary side; an additional rectifier coupled between the secondary side of the additional transformer and a gate of the failsafe device; an additional inverter configured to change Vin to an AC current for energizing the primary side of the additional transformer; and an additional capacitor in series with the primary side of the additional transformer, wherein the controller is configured to operate the additional inverter in a first mode such that the additional capacitor pre-charges to |Vin| before the controller receives a turn ON command for the failsafe device, the additional capacitor charges to Y*|Vin| during a first part of a first switching cycle after the controller receives the turn ON command for the failsafe device where Y>1, and the voltage of the additional capacitor resonates with a magnetizing inductance of the primary side of the additional transformer during a second part of the first switching cycle.

Example 24. The power electronics system of example 23, wherein the controller is configured to operate the additional inverter in a second mode that follows the first mode of the additional inverter, wherein the additional inverter is operated at a lower switching frequency in the second mode than in the first mode, and wherein the failsafe device is configured to remain on when the controller operates the additional inverter in the second mode.

Terms such as "first", "second", and the like, are used to describe various elements, regions, sections, etc. and are also not intended to be limiting. Like terms refer to like elements throughout the description.

The expression "and/or" should be interpreted to include all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An isolated DC/DC converter, comprising:
a transformer having a primary side and a secondary side;
an inverter configured to change a DC input voltage (Vin) to an AC current for energizing the primary side of the transformer;
a capacitor in series with the primary side of the transformer; and
a controller configured to operate the inverter in a first mode such that the capacitor pre-charges to |Vin| before the controller receives a turn ON command, the capacitor charges to X*|Vin| during a first part of a first switching cycle after the controller receives the turn ON command where X>1, and the capacitor voltage resonates with a magnetizing inductance of the primary side of the transformer during a second part of the first switching cycle.

2. The isolated DC/DC converter of claim 1, wherein the inverter is a full-bridge inverter comprising a first leg and a second leg, wherein each leg comprises a high-side switch device in series with a low-side switch device, wherein the high-side switch device of the first leg and the low-side switch device of the second leg form a first phase of the inverter, wherein the high-side switch device of the second leg and the low-side switch device of the first leg form a second phase of the inverter, and wherein the controller is configured to operate the first and second phases in a complementary manner.

3. The isolated DC/DC converter of claim 2, wherein before receiving the turn ON command in the first mode, the controller is configured to keep on the high-side switch device and the low-side switch device of one of the phases to pre-charge the capacitor to |Vin|.

4. The isolated DC/DC converter of claim 2, wherein during the first part of the first switching cycle in the first mode, the controller is configured to deactivate the phase used to pre-charge the capacitor to |Vin| and then activate the complementary phase.

5. The isolated DC/DC converter of claim 2, wherein during the second part of the first switching cycle in the first mode, the controller is configured to deactivate the phase used during the first part of the first switching cycle and then activate the complementary phase.

6. The isolated DC/DC converter of claim 1, wherein the controller is configured to operate the inverter in the first mode for at least one additional switching cycle, wherein during a first part of each additional switching cycle, the controller is configured to operate the inverter to charge the capacitor to X*|Vin|, and wherein during a second part of each additional switching cycle, the controller is configured to operate the inverter such that the capacitor voltage resonates with the magnetizing inductance of the primary side of the transformer.

7. The isolated DC/DC converter of claim 1, wherein the controller is configured to operate the inverter in a second mode that follows the first mode, wherein the inverter is operated at a lower switching frequency in the second mode than in the first mode.

8. The isolated DC/DC converter of claim 7, wherein the controller is configured to control the switching frequency and the voltage across the capacitor in the second mode to generate a constant current source that is independent of Vin.

9. The isolated DC/DC converter of claim 7, wherein the controller comprises:
a peak detector configured to determine when the capacitor voltage reaches a peak value; and
a delay-locked loop configured to maintain an on-phase for the inverter in the second mode.

10. The isolated DC/DC converter of claim 7, wherein the controller is configured to trim an oscillator in the first mode to tune the switching frequency in the first mode, and wherein the controller is configured to use a minimum clock cycle in the second mode such that the capacitor fully pre-charges to Vin prior to charge transfer to the secondary side of the transformer.

11. The isolated DC/DC converter of claim 1, wherein in the first mode, the controller is configured to determine when to transition from the first part of the first switching cycle to the second part of the first switching cycle based on the capacitor voltage.

12. The isolated DC/DC converter of claim 11, wherein the controller is configured to transition from the first part of the first switching cycle to the second part of the first switching cycle when the capacitor voltage is at or near a peak value.

13. The isolated DC/DC converter of claim 1, further comprising:
a rectifier coupled between the secondary side of the transformer and a gate of a power switch device,
wherein the power switch device is configured to turn on when the controller operates the inverter in the first mode.

14. The isolated DC/DC converter of claim 13, wherein the controller is configured to operate the inverter in a second mode that follows the first mode, wherein the inverter is operated at a lower switching frequency in the second mode than in the first mode, and wherein the power switch device is configured to remain on when the controller operates the inverter in the second mode.

15. The isolated DC/DC converter of claim 14, wherein the power switch device is a gate injection transistor having a non-isolated p-GaN gate structure, wherein the controller is configured to control the switching frequency of the inverter and the voltage across the capacitor in the second mode to generate a constant current source for energizing the primary side of the transformer, and wherein the rectifier is configured to convert energy transferred to the secondary side of the transformer from the constant current source in the second mode into a current that is injected into the non-isolated p-GaN gate structure to maintain the gate injection transistor in the on-state.

16. The isolated DC/DC converter of claim 13, further comprising:
an additional transformer having a primary side and a secondary side;
a pulldown switch device configured to turn off the power switch device;
an additional rectifier coupled between the secondary side of the additional transformer and a gate of the pulldown switch device;
an additional inverter configured to change Vin to an AC current for energizing the primary side of the additional transformer; and
an additional capacitor in series with the primary side of the additional transformer,
wherein the controller is configured to operate the additional inverter in a first mode such that the additional capacitor pre-charges to |Vin| before the controller receives a turn ON command for the pulldown switch device, the additional capacitor charges to Y*|Vin| during a first part of a first switching cycle after the controller receives the turn ON command for the pulldown switch device where Y>1, and the voltage of the additional capacitor resonates with a magnetizing inductance of the primary side of the additional transformer during a second part of the first switching cycle.

17. The isolated DC/DC converter of claim 16, wherein the controller is configured to operate the additional inverter in a second mode that follows the first mode of the additional inverter, wherein the additional inverter is operated at a lower switching frequency in the second mode than in the first mode, and wherein the pulldown switch device is configured to remain on when the controller operates the additional inverter in the second mode.

18. The isolated DC/DC converter of claim 13, further comprising:
an additional transformer having a primary side and a secondary side;
an additional rectifier coupled between the secondary side of the additional transformer and a gate of an additional power switch device connected in series with the power switch device;
an additional inverter configured to change Vin to an AC current for energizing the primary side of the additional transformer; and
an additional capacitor in series with the primary side of the additional transformer,
wherein the controller is configured to operate the additional inverter in a first mode such that the additional capacitor pre-charges to |Vin| before the controller receives a turn ON command for the additional power switch device, the additional capacitor charges to Z*|Vin| during a first part of a first switching cycle after the controller receives the turn ON command for the additional power switch device where Z>1, and the voltage of the additional capacitor resonates with a magnetizing inductance of the primary side of the additional transformer during a second part of the first switching cycle.

19. The isolated DC/DC converter of claim 18, wherein the controller is configured to operate the additional inverter in a second mode that follows the first mode of the additional inverter, wherein the additional inverter is operated at a lower switching frequency in the second mode than in the first mode, and wherein the additional power switch device is configured to remain on when the controller operates the additional inverter in the second mode.

20. The isolated DC/DC converter of claim 19, wherein the additional power switch device is a gate injection transistor having a non-isolated p-GaN gate structure, wherein the controller is configured to control the switching frequency of the additional inverter and the voltage across the additional capacitor in the second mode of the additional inverter to generate a constant current source for energizing the primary side of the additional transformer, and wherein the additional rectifier is configured to convert energy transferred to the secondary side of the additional transformer from the constant current source in the second mode into a current that is injected into the non-isolated p-GaN gate structure to maintain the gate injection transistor in the on-state.

21. A power electronics system, comprising:
   a power switch device;
   a pulldown switch device configured to turn off the power switch device when the pulldown switch device is on;
   a flyback converter configured to drive a gate of the power switch device; and
   an isolated DC/DC converter comprising:
      a transformer having a primary side and a secondary side;
      a rectifier coupled between the secondary side of the transformer and a gate of the pulldown switch device;
      an inverter configured to change a DC input voltage (Vin) to an AC current for energizing the primary side of the transformer;
      a capacitor in series with the primary side of the transformer; and
      a controller configured to operate the inverter in a first mode such that the capacitor pre-charges to |Vin| before the controller receives a turn ON command for the pulldown switch device, the capacitor charges to X*|Vin| during a first part of a first switching cycle after the controller receives the turn ON command where X>1, and the capacitor voltage resonates with a magnetizing inductance of the primary side of the transformer during a second part of the first switching cycle.

22. The power electronics system of claim 21, wherein the controller is configured to operate the inverter in a second mode that follows the first mode, wherein the inverter is operated at a lower switching frequency in the second mode than in the first mode, and wherein the pulldown switch device is configured to remain on when the controller operates the inverter in the second mode.

23. The power electronics system of claim 21, further comprising:
   a failsafe device configured to protect the pulldown switch device from overvoltage; and
   an additional isolated DC/DC converter comprising:
      an additional transformer having a primary side and a secondary side;
      an additional rectifier coupled between the secondary side of the additional transformer and a gate of the failsafe device;
      an additional inverter configured to change Vin to an AC current for energizing the primary side of the additional transformer; and
      an additional capacitor in series with the primary side of the additional transformer,
   wherein the controller is configured to operate the additional inverter in a first mode such that the additional capacitor pre-charges to |Vin| before the controller receives a turn ON command for the failsafe device, the additional capacitor charges to Y*|Vin| during a first part of a first switching cycle after the controller receives the turn ON command for the failsafe device where Y>1, and the voltage of the additional capacitor resonates with a magnetizing inductance of the primary side of the additional transformer during a second part of the first switching cycle.

24. The power electronics system of claim 23, wherein the controller is configured to operate the additional inverter in a second mode that follows the first mode of the additional inverter, wherein the additional inverter is operated at a lower switching frequency in the second mode than in the first mode, and wherein the failsafe device is configured to remain on when the controller operates the additional inverter in the second mode.

* * * * *